United States Patent Office 2,811,534
Patented Oct. 29, 1957

2,811,534

METHOD OF MANUFACTURE OF THE BIOLOGICALLY ACTIVE COUMARINE DERIVATIVES

Karel Fučík, Tocna Komorany, near Prague, Czechoslovakia, assignor to Spofa, United Pharmaceutical Works, National Corporation, Prague, Czechoslovakia No Drawing. Application December 22, 1950,
Serial No. 202,433

Claims priority, application Czechoslovakia
December 31, 1949

6 Claims. (Cl. 260—343.2)

It is known that some coumarine derivatives are characterized by an action against coagulation of the blood. Though there is no great difference in the types of physiological effects which the various active derivatives exhibit, the various active derivatives do differ greatly among themselves as to the degree of the effect achieved, that is, the intensity and duration of their action and the speed with which their action starts and terminates. However, no means of establishing the relationship between the chemical constitution of the coumarine derivatives and their action, either from the point of view of type of action or the point of view of degree of action has been known. It was therefore a surprising discovery that the substances of the type of 3-[2,3-(coumarinyl-3',4')-5-alkyl furanyl-4]-4 hydroxy coumarine exhibit an action against coagulation of the blood, which action, in comparison with the action of the other anti-coagulants starts promptly and quickly dies away, so that these substances are very suitable for clinical use. These substances and methods of producing the same have as yet never been described in the literature.

Now it has been established that it is possible to prepare the coumarine derivatives of the above-mentioned type in accordance with the following equations:

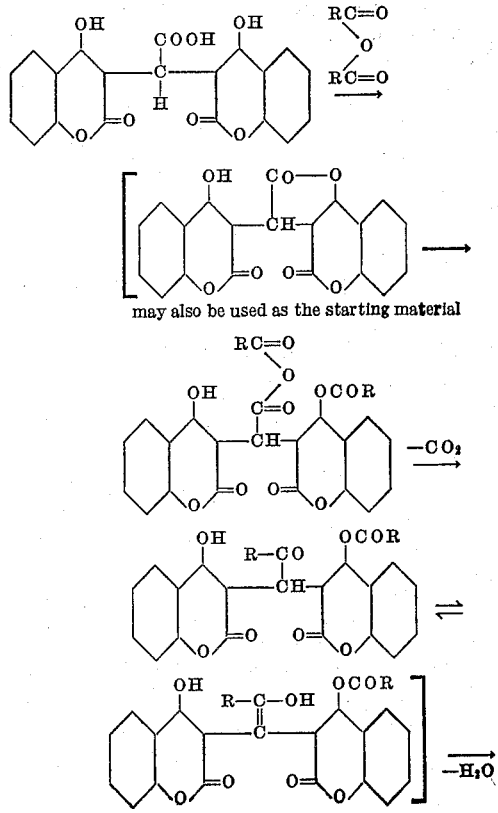

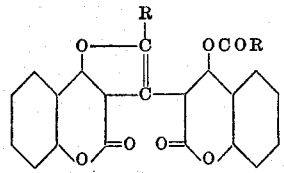

R = alkyl, aryl i. e. in such a manner that the bis-4-oxycoumarinylacetic acid, or on its dehydration product prepared according to U. S. patent application Serial Nos. 113,491 and 113,492, now abandoned and combined into U. S. patent application Serial No. 273,572, is reacted with the anhydrides of the aliphatic acids, preferably with the anhydrides of the aliphatic acids having less than 5 carbon atoms, for example, acetic acid, propionic acid, etc.

It is apparent from the above reaction equations that the mentioned reaction of the anhydrides of the aliphatic acids with the bis-4-oxycoumarinyl acetic acid or its dehydration product prepared according to U. S. patent application Serial No. 273,572, occurs in such a manner that a dehydration and a decarboxylation of the product takes place simultaneously with an intramolecular rearrangement and another dehydration, whereby a series of corresponding unstable intermediates are formed. However, at the end of the reaction under the given reaction conditions according to the present invention, a stable acylated product is obtained which is very easily deacylated by saponification. Such product is a highly active factor against the coagulation of the blood, and is characterized by a prompt beginning of its action and by a short duration of the same.

Example 1

10 grams of bis-4-oxycoumarinylacetic acid are brought into contact with 40 ml. of the anhydride of acetic acid, and boiled 2 hours. After having been cooled, the precipitated crystalline product is filtered off by suction. The yield consists of 10 grams of 3-[2,3-(coumarinyl-3',4')-5-methyl-furyl-4]-4-acetoxy-coumarine having a melting point of 252° C.

Example 2

10 grams of the dehydration product of bis-4-oxycoumarinylacetic acid, prepared according to U. S. patent application Serial No. 273,572, are brought into contact with 40 ml. of acetic acid anhydride and boiled 2 hours. After cooling, the crystalline product is filtered off by suction. The yield consists of 10 grams of 3-[2,3-(coumarinyl - 3',4') - 5 - methyl - furyl - 4] - 4 - acetoxy - coumarine having a melting point of 252° C.

Example 3

1 gram of bis-4-oxycoumarinylacetic acid is boiled with 4 ml. of the anhydride of propionic acid. After cooling, the resulting crystalline product is 3-[2,3-(coumarinyl-3',4')-5-ethyl furyl-4]-4-propionyloxy coumarine having a melting point of 217° C.

What I claim is:

1. A process of producing physiologically active coumarine derivatives, comprising the steps of refluxing bis-4-hydroxycoumarinyl acetic acid with at least one anhydride selected from the group consisting of acetic anhydride and propionic anhydride for a time sufficient to dehydrate, decarboxylate and acylate said bis-4-hydroxycoumarinyl acetic acid; and recovering the thus formed dehydrated, decarboxylated and acylated reaction product, thereby obtaining a physiologically active coumarine derivative having the formula

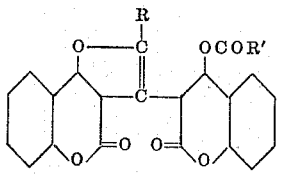

wherein R and R' are alkyl radicals having a maximum of 3 carbon atoms in the aliphatic chain.

2. A process of producing physiologically active coumarine derivatives, comprising the steps of refluxing bis-4-hydroxycoumarinyl acetic acid with acetic anhydride for a time sufficient to dehydrate, decarboxylate and acylate said bis-4-hydroxycoumarinyl acetic acid; and recovering the thus formed dehydrated, decarboxylated and acylated reaction product, thereby obtaining a physiologically active coumarine derivative having the structural formula

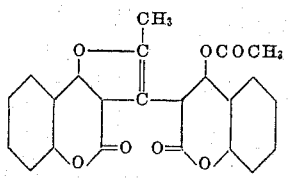

3. A process of producing physiologically active coumarine derivatives, comprising the steps of refluxing bis-4-hydroxycoumarinyl acetic acid with propionic anhydride for a time sufficient to dehydrate, decarboxylate and acylate said bis-4-hydroxycoumarinyl acetic acid, and recovering the thus formed dehydrated, decarboxylated and acylated reaction product, thereby obtaining a physiologically active coumarine derivative having the structural formula

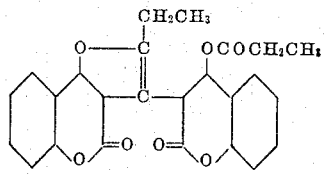

4. As a new composition of matter, a physiologically active coumarine derivative having the formula

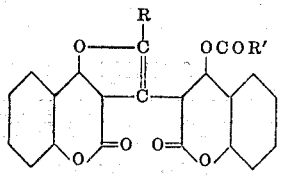

wherein R and R' are alkyl radicals having a maximum of 3 carbon atoms in the aliphatic chain.

5. As a new composition of matter, the physiologically active coumarine derivative, 3-[2,3-(coumarinyl-3,4)-5-methyl furanyl-4]-4-acetoxy coumarine having a melting point of 252° C. and having the structural formula

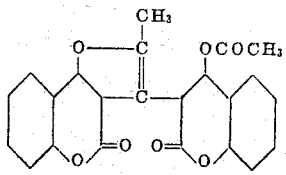

6. As a new composition of matter, the physiologically active coumarine derivative, 3-[2,3-(coumarinyl-3,4)-5-ethyl furanyl-4]-4-propionyloxy coumarine having a melting point of 217° C. and having the structural formula

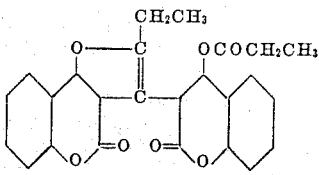

References Cited in the file of this patent
UNITED STATES PATENTS 2,601,308    Lovas _____ June 24, 1952

OTHER REFERENCES

Huebner et al.: J. Am. Chem. Soc., vol. 65, pp. 2292–6 (1943).
Grussner: Chem. Abstracts, vol. 41, pp. 6232–3 (1947).
Fucik et al.: Bull. Soc. Chim. de France, vol. 1949, pp. 99–103.